United States Patent
Baker et al.

(10) Patent No.: US 10,740,144 B2
(45) Date of Patent: *Aug. 11, 2020

(54) CONTROLLING ASYNCHRONOUS TASKS (71) Applicant: INTERNATIONAL BUSINESS MACHINES CORPORATION, Armonk, NY (US)

(72) Inventors: Christopher J. Baker, Eastleigh (GB); Pradeep Gohil, Eastleigh (GB); Jenny Jing He, Chandler's Ford (GB); Julian Horn, Eastleigh (GB); Christopher J. Poole, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,603

(22) Filed: Nov. 6, 2017

(65) Prior Publication Data

US 2019/0108054 A1    Apr. 11, 2019

Related U.S. Application Data

(63) Continuation of application No. 15/726,600, filed on Oct. 6, 2017.

(51) Int. Cl.
  *G06F 9/46*    (2006.01)
  *G06F 9/48*    (2006.01)
  *G06F 9/50*    (2006.01)

(52) U.S. Cl.
  CPC ............ *G06F 9/485* (2013.01); *G06F 9/4881* (2013.01); *G06F 9/505* (2013.01)

(58) Field of Classification Search
  CPC ....................................................... G06F 9/485
  See application file for complete search history.

(56) References Cited

U.S. PATENT DOCUMENTS

| | | | |
|---|---|---|---|
| 8,200,842 B1* | 6/2012 | Lau ....................... | G06F 9/4881 709/245 |
| 9,256,467 B1 | 2/2016 | Singh et al. | |
| 9,658,887 B2 | 5/2017 | Chin et al. | |
| 2002/0065701 A1* | 5/2002 | Kim ................. | G06Q 10/06311 705/7.13 |
| 2005/0235285 A1* | 10/2005 | Monasterio ........... | G06F 9/4843 718/100 |
| 2006/0156308 A1* | 7/2006 | Jarvis ..................... | G06F 9/524 718/104 |

(Continued)

OTHER PUBLICATIONS

Grace Period Disclosure—available CICS open beta Dec. 23, 2016; CICS TS 5.4.

(Continued)

*Primary Examiner* — Wissam Rashid
(74) *Attorney, Agent, or Firm* — William A. Kinnaman, Jr., Esq; Kevin P. Radigan, Esq.; Heslin Rothenberg Farley & Mesiti P.C.

(57) ABSTRACT

Controlling asynchronous tasks in a transaction system. A request to start an asynchronous child task is obtained, and a resource status of the system is determined. It is determined whether to suspend a parent task associated with the asynchronous child task or to execute the asynchronous child task based on the determined resource status of the system.

10 Claims, 6 Drawing Sheets

(56) References Cited

U.S. PATENT DOCUMENTS

| | | | | |
|---|---|---|---|---|
| 2009/0125907 A1* | 5/2009 | Wen | .............. | G06F 9/4843 |
| | | | | 718/101 |
| 2011/0078703 A1* | 3/2011 | Dokovski | ......... | G06F 17/30884 |
| | | | | 719/315 |
| 2012/0272247 A1* | 10/2012 | Scott | .............. | G06F 9/4881 |
| | | | | 718/108 |
| 2013/0125127 A1* | 5/2013 | Mital | .............. | G06F 9/46 |
| | | | | 718/102 |
| 2013/0152097 A1* | 6/2013 | Boctor | .............. | G06F 9/505 |
| | | | | 718/103 |
| 2015/0143381 A1* | 5/2015 | Chin | .............. | G06F 9/485 |
| | | | | 718/104 |
| 2017/0083373 A1 | 3/2017 | Jones et al. | | |

OTHER PUBLICATIONS

Baker et al., "Controlling Asynchronous Tasks", U.S. Appl. No. 15/726,600, filed Oct. 6, 2017, pp. 1-36.
List of IBM Patents and/or Patent Applications Treated as Related, Jan. 12, 2018, pp. 1-2.

\* cited by examiner

CONTROLLING ASYNCHRONOUS TASKS

CROSS-REFERENCE TO RELATED APPLICATIONS

This application is a continuation of co-pending U.S. patent application Ser. No. 15/726,600, filed Oct. 6, 2017, entitled "CONTROLLING ASYNCHRONOUS TASKS," which is hereby incorporated herein by reference in its entirety.

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE(S): CICS open beta Dec. 23, 2016; CICS TS 5.4

BACKGROUND

One or more aspects of the present invention relate to controlling asynchronous tasks in transaction systems.

Transaction systems, such as enterprise transaction processing systems, often run tens of thousands of tasks in parallel. Ensuring the stability of a transaction system so that it can process and maintain the throughput and the response time is therefore an important consideration. This is particularly the case for a transaction system employing asynchronous applications, in which a parent task executes one or more child tasks.

For example, a system may be flooded with child tasks which may then cause the parent task(s) to wait a long time for a response and/or prevent other applications from being able to start. To relieve the system from such a situation, the system administrator typically has to manually intervene, and thus, spend a large amount of time to determine and cancel the blocking tasks.

SUMMARY

Shortcomings of the prior art are overcome and additional advantages are provided through the provision of a computer-implemented method of controlling asynchronous tasks in a system. The computer-implemented method includes, for instance, obtaining a request to start an asynchronous child task. A resource status of the system is determined. A determination is made as to whether to suspend a parent task associated with the asynchronous child task or to start the asynchronous child task based on the resource status of the system.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Embodiments of the present invention will now be described, by way of example only, with reference to the following drawings, in which.

DETAILED DESCRIPTION

It should be understood that the figures are merely schematic and are not drawn to scale. It should also be understood that the same reference numerals are used throughout the figures to indicate the same or similar parts.

In the context of aspects of the present application, where embodiments of aspects of the present invention constitute a method, it should be understood that such a method is a process for execution by a computer, i.e. is a computer-implementable method. The various steps of the method may therefore reflect various parts of a computer program, e.g. various parts of one or more algorithms.

Also, in the context of aspects of the present application, a system may be a single device or a collection of distributed devices that are adapted to execute one or more embodiments of the methods of aspects of the present invention. For instance, a system may be a personal computer (PC), a server, or a collection of PCs and/or servers connected via a network, such as a local area network, the Internet, and so on, to cooperatively execute at least one embodiment of the present invention.

Provided herein is a capability for controlling asynchronous tasks in a transaction system, such as child tasks of parent tasks that already exist (i.e., are already running or being executed) in the system. By determining whether to suspend a running (parent) task before it starts a child task based on a status of one or more resources of the system, embodiments may provide an autonomic control method that does not require the intervention of a system administrator.

For example, analysis of available resource(s) may be undertaken when a task is already running in the system and this task (e.g., a parent task) wants to start one or more child tasks. In this way, an autonomic control method to control the parent task so it only starts the child task when the system is not overloaded may be provided. Thus, if the system is overloaded, the parent task may be suspended and queued until the system's load is decreased to a certain level (e.g., a predetermined level that permits or enables the child task to be executed without creating delays).

The parent task may be an existing task that is running in the system, and the child task may be a task that is associated with the parent task so that there is provided a parent-child relationship between the task. By way of example, the parent task may be a task of a client application that is executed by the system, and the child task may be started by the parent task, by another task of the client application, or by another client application. Thus, it will be appreciated that a request (or call) to execute or start a child task may originate from many different sources, such as: the parent task; another task; a client application to which the parent task belongs; or another client application of the system.

By employing one or more aspects of the present invention, execution or processing of a parent task may be delayed and then have a chance to start its child task. This may be more acceptable to an end user than simply terminating the parent task (as may happen in conventional systems). Embodiments may thus help to ensure a transaction system maintains a capacity to serve other types of business applications.

If it is determined to suspend the parent task, an embodiment may determine an updated resource status of the system, and then determine whether to resume the parent task based on the determined updated resource status of the system. The process of checking if a task is eligible to start may therefore be repeatedly undertaken so as to keep checking the status of the system's load. In this way, a parent task may, e.g., only be suspended until a time at which it is determined that the parent task may be resumed. An approach to identifying when a suspended task can be resumed may thus be provided by one or more embodiments. For example, an embodiment may periodically determine a number of tasks in the system so as to identify if and when the number of tasks decreases below a predetermined amount and, upon identifying the number of tasks is below the predetermined amount, a suspended parent task may be resumed (e.g., removed from a queue).

Further, if it is determined to resume the parent task, one or more embodiments may repeat: determining a resource status of the system; and determining whether to suspend the parent task or start the asynchronous child task based on the determined resource status of the system. In this way, a status of the system resource(s) may once again be checked to determine if it is OK to resume the task and start the requested child task. This approach may enable different criteria to be used for the processes of checking whether to resume a suspended task and checking whether to suspend a task. Improved control and flexibility of suspending and resuming tasks may therefore be provided.

By way of example, the resource status of the system may include a measure of at least one of: a number of tasks running in the system; a number of child tasks running in the system; a maximum number of tasks that is allowed to run in the system; available memory resources of the system; available computing resources of the system; a response time of the system; and a processing load of the system. Many types of system resources, system details and/or system parameters may therefore be used to assess whether to suspend a task (e.g., so as to prevent execution of a child task). These may be used on their own or in combination with each other. A high level of flexibility and detail may be provided by one or more aspects.

For instance, an embodiment may take into account of the current number of tasks in the system, the maximum number of tasks allowed in the system, and the number of child tasks already in the system, to decide whether to suspend the parent task or not. If it is determined that the parent task should be suspended, it may then be placed into a queue of parent tasks. When the number of tasks in the system has decreased to below a predetermined level, the suspended parent task may then be resumed and the method may once again check if it is eligible to start its child task.

In an embodiment, the determining whether to suspend the parent task or start the asynchronous child task based on the determined resource status of the system may include: comparing the determined resource status with a predetermined threshold, wherein the threshold is, e.g., representative of a resource status at which the system is overloaded; and determining whether to suspend the parent task or start the asynchronous child task based on the result of the comparison. In this way, a parent task may be controlled depending on whether or not system resource criteria are met. For example, if it is determined to suspend the parent task, an embodiment may include suspending the parent task by placing the parent task in a queue.

Embodiments may overcome shortcomings of existing task control concepts which require manual intervention and/or exhibit long waiting/response times.

Accordingly, there may be provided an approach which provides autonomic control of a running/executing parent task according to available resource(s) of a transaction system such that overall system performance is improved (e.g., by avoiding excessive delays and/or adverse effects that would otherwise be caused by executing a child task with insufficient available resource(s)).

Embodiments may also provide for reducing a number of executing tasks in a system, so as to facilitate controlled loading of a system (e.g., by avoiding overloading a system resource).

Embodiments may therefore provide for controlling asynchronous task execution in large or distributed transaction systems. Dynamic task execution control capabilities may therefore be provided by one or more embodiments, and such capabilities may be based on a status or current usage of one or more system resources.

Modifications and additional steps to a transaction system may also be provided which may enhance the value and utility of the provided aspects.

Figure 1:
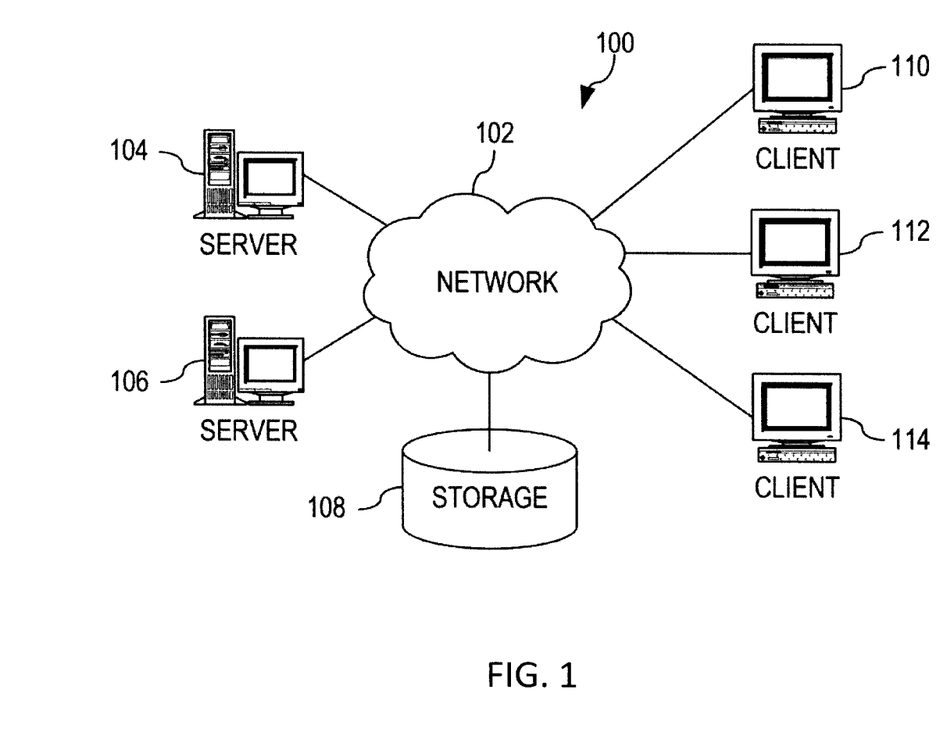
FIG. 1 depicts a pictorial representation of an example distributed system in which aspects of the illustrative embodiments may be implemented.
Figure 2:
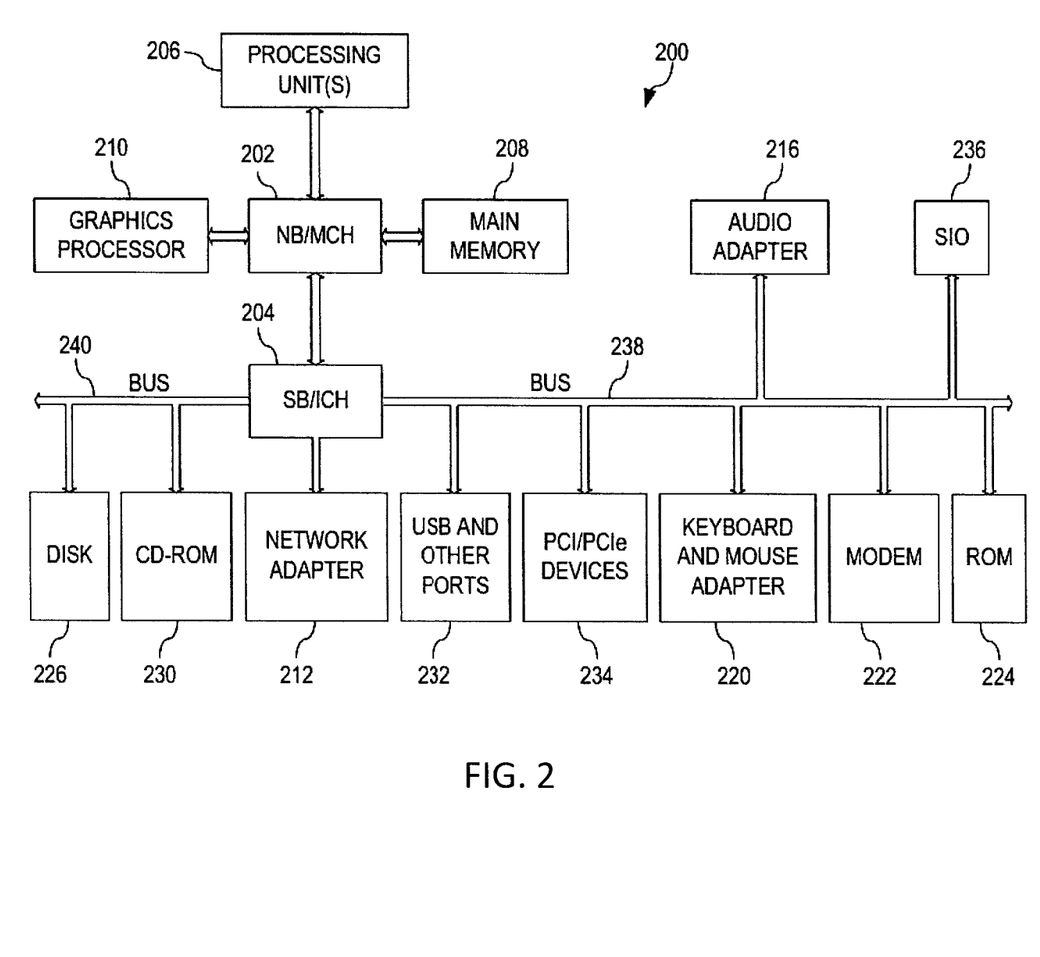
FIG. 2 is a block diagram of an example system in which aspects of the illustrative embodiments may be implemented.

Embodiments may be utilized in many different types of task processing environments. In order to provide a context for the description of elements and functionality of the illustrative embodiments, FIGS. 1 and 2 are provided hereafter as example environments in which aspects of the embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of aspects of the present invention.

FIG. 1 depicts a pictorial representation of an example distributed transaction processing storage system in which aspects of the embodiments may be implemented. Distributed system 100 may include a network of computers in which aspects of the embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables, as examples.

In the depicted example, a first server 104 and a second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the embodiments may be implemented. The system 200 is an example of a computer, such as client 110 in FIG. 1, in which computer usable code or instructions implementing the processes for embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, universal serial bus (USB) ports and other communication ports 232, and PCI/PCIe devices 234 connect to the SB/ICH 204 through a first bus 238 and a second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java programming system, may run in conjunction with the operating system and provides calls to the operating system from Java programs or applications executing on system 200.

As a server, system 200 may be, for example, an IBM eServer System p computer system, running the Advanced Interactive Executive (AIX) operating system or the LINUX operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for embodiments of the present invention may be performed by processing unit 206 using computer usable program code, which may be located in a memory, such as, for example, main memory 208, ROM 224, or in one or more peripheral devices 226 and 230.

A bus system, such as first bus 238 or second bus 240 as shown in FIG. 2, may comprise one or more buses. The bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache, such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of one or more embodiments may be applied to a multiprocessor data processing system, other than the system mentioned previously, without departing from the spirit and scope of aspects of the present invention.

Moreover, the system 200 may take the form of any of a number of different data processing systems including client computing devices, server computing devices, a tablet computer, laptop computer, telephone or other communication device, a personal digital assistant (PDA), or the like. In some examples, the system 200 may be a portable computing device that is configured with flash memory to provide non-volatile memory for storing operating system files and/or user-generated data, for example. Thus, the system 200 may essentially be any known or later-developed data processing system without architectural limitation.

One or more aspects may enhance control of parent and child tasks in a system. By making control of tasks based on a status of one or more resources or operational properties of the system, embodiments may facilitate an asynchronous task start in a large transaction system, for example. Such control need not require the intervention of a system administrator. Aspects may therefore extend or improve the task control capabilities and/or resource utilization of a transaction system.

Figure 3:
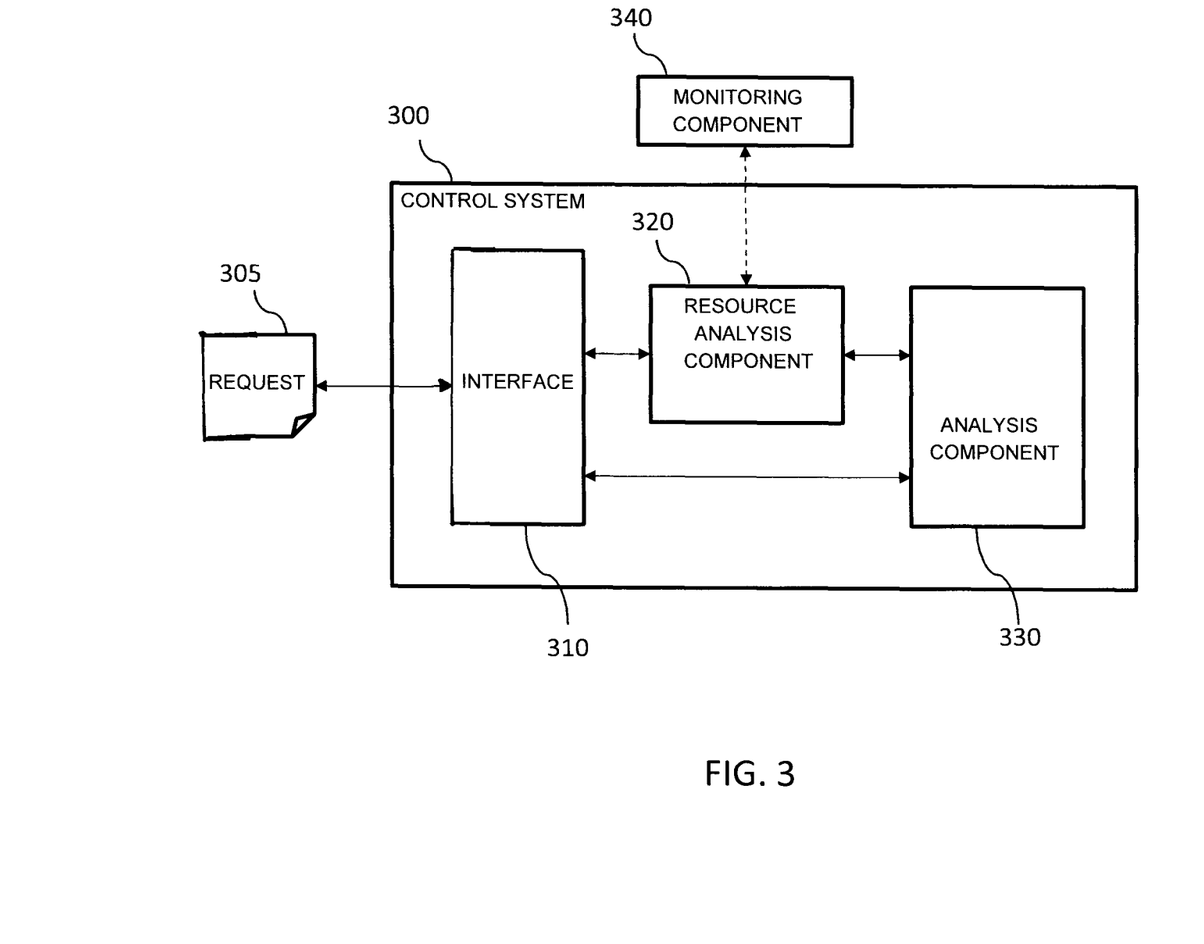
FIG. 3 is a simplified block diagram of a control system according to an embodiment.

Referring now to FIG. 3, there is depicted a simplified block diagram of a control system 300 according to an embodiment.

In one example, the control system 300 is for controlling asynchronous tasks in a transaction system. In particular, the control system 300 may be adapted to control tasks by controlling the execution of one or more parent tasks running in the transaction system (not shown in FIG. 3). Such control may, for instance, be achieved by suspending a parent task depending on a status of one or more resources of the transaction system. By suspending a parent task, a child task of the parent task may be prevented from running, for example.

Accordingly, it will be understood that an asynchronous child task (e.g., a task associated with a parent task such that it has a parent-child relationship with the parent task) may be controlled so that its execution only occurs when the status of the transaction system's resource(s) meets a predetermined requirement (e.g., when a number of tasks running in the transaction system is below a predetermined number).

In the example of FIG. 3, the control system 300 includes an interface 310 adapted to obtain a request 305 to start an asynchronous child task. By way of example, a parent task may be a task of a client application that is executed by a transaction system, and the child task may be started by any of: the parent task; another task of the client application; and another client application, for example. Thus, it will be appreciated that a request (or call) 305 to start a child task may originate from many different sources, such as: the parent task; another task; a client application to which the parent task belongs; or another client application of the system, as examples. The interface 310 may thus be adapted to receive a request (or call) 305 to start a child task via one or more suitable communication links/protocols (e.g., depending on the expected origin(s) of such requests).

The control system 300 also includes a resource analysis component 320 adapted to determine a resource status of the transaction system. By way of example, a resource status of the transaction system may include a measure of at least one of: a number of tasks running in the system; a number of child tasks running in the system; a maximum number of tasks that is allowed to run in the system; available memory resources of the system; available computing resources of the system; a response time of the system; and a processing load of the system. Put another way, a resource status may be adapted to represent a current status or value of one or more operating parameters, characteristics, features or constraints of the transaction system that may influence the execution of a task and/or the performance of the transaction system. For this purpose, the resource analysis component 320 may communicate with a monitoring component 340 that is adapted to measure and/or monitor one or more values of transaction system resource(s).

For the avoidance of doubt, it will be appreciated that the monitoring component 340 may be provided separately from the control system 300 (e.g., as part of the transaction system). However, in other embodiments, the control system 300 may include the monitoring component 340 (e.g., as part of the resource analysis component 320).

The control system 300 further includes an analysis component 330 adapted to determine whether to suspend an existing parent task associated with the child task or to start the asynchronous child task based on the determined resource status of the system. For example, in the embodiment of FIG. 3, the analysis component 330 is adapted to: compare the determined resource status with a predetermined threshold, wherein the threshold is representative of a resource status at which the system is overloaded; and to determine whether to suspend the parent task or start the asynchronous child task based on the result of the comparison. If the analysis component 330 determines to suspend the parent task, the control system 300 suspends the parent task by placing the parent task in a queue.

Also, where the analysis component 330 determines to suspend the parent task, the analysis component 330 is adapted to determine an updated resource status of the system (e.g., by requesting an update resource status from the resource analysis component 320) and to then determine whether to resume the parent task based on the determined updated resource status of the system. Then, if it is determined to resume the parent task, the control system 300 controls the resource analysis component 320 to determine an updated (e.g., current or up-to-date) resource status of the transaction system, and controls the analysis component 330 to determine whether to suspend the parent task or start the asynchronous child task based on the updated resource status of the transaction system.

From the description provided above, it will be understood that one or more embodiments may provide an autonomic control capability that reduces (or even eliminates) the intervention of a system administrator. By way of example, such embodiments may address the specific issue of controlling the execution of a child task when a parent task is already running in a transaction processing system. Thus, an autonomic control method to control the parent task so it only starts the child task when the system is not overloaded may be provided. If the system is overloaded, embodiments may suspend the parent task, queue it and then resume it when the system's load is decreased to a certain (e.g., predetermined satisfactory load) level.

Example embodiments may take into account: a current number of tasks in the system; a maximum number of tasks allowed in the system; and a number of child tasks already in the system, in order to decide whether to suspend the parent task or not. If it is decided that the parent task should be suspended, the parent task may be placed in a queue (e.g., ordered store) of parent tasks. Then, when the number of tasks in the system has decreased to below a threshold value, the suspended parent task will be resumed and it may be once again checked if it is eligible to start its child task. With this approach, a parent task may be delayed and get a chance to start its child task. This may be more acceptable to an end user than simply terminating the parent task. In this way, the system may maintain an available capacity to serve other types of business applications.

Figure 4:
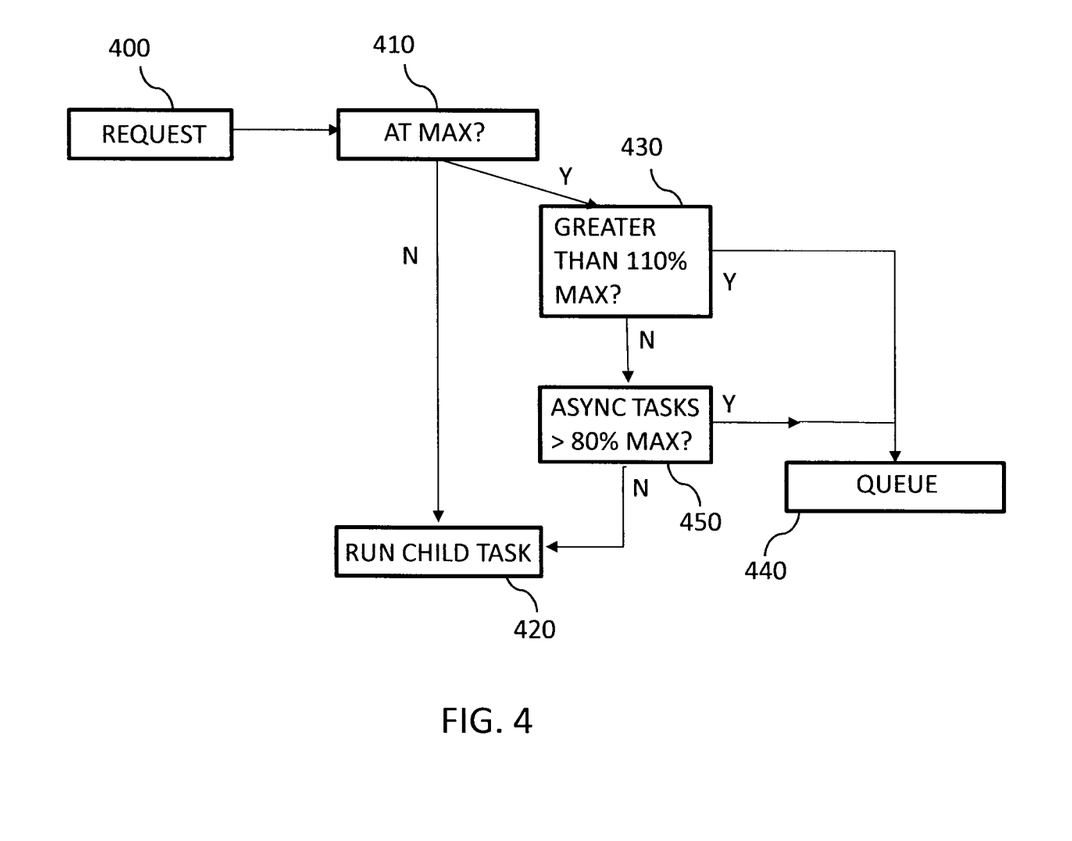
FIG. 4 is one example of a flow diagram of a method according to an embodiment, in which the method determines whether to suspend a parent task or allow it to start its asynchronous child task.

Referring now to FIG. 4, there is depicted one example a flow diagram of a method according to an embodiment, in which the method determines whether to suspend a parent task or allow it to start its asynchronous child task.

The method begins in step 400, in which a request to start a child task is received.

The method then proceeds to step 410, in which a resource status of the system is determined and checked against a predetermined threshold resource status value. More specifically, in the example embodiment of FIG. 4, the resource status includes a value of the total number of tasks running in the system, and step 410 includes checking if the total number of tasks running in the system is greater than, e.g., 100% of a predetermined maximum number MAX of tasks.

If, in step 410, it is determined that the total number of tasks running in the system is not greater than (i.e., is less than), e.g., 100% of the predetermined maximum number MAX of tasks, the method proceeds to step 420 in which the asynchronous child task is started (e.g., executed or run). Conversely, if, in step 410, it is determined that the total number of tasks running in the system is greater than, e.g., 100% of the predetermined maximum number MAX of tasks, the method proceeds to step 430 which includes checking if the total number of tasks running in the system is greater than, e.g., 110% of the predetermined maximum number MAX of tasks.

If, in step 430, it is determined that the total number of tasks running in the system is greater than, e.g., 110% of the predetermined maximum number MAX of tasks, the method proceeds to step 440 in which the parent task is suspended and placed in a queue. This may enable the system to have a chance to finish the existing tasks so the load (e.g., number of tasks) of the system may decrease to a number lower than the maximum number MAX of tasks.

Conversely, if, in step 430, it is determined that the total number of tasks running in the system is not greater than (i.e., is less than), e.g., 110% of the predetermined maximum number MAX of tasks, the method proceeds to step 450 in which the total number of asynchronous child tasks in the system is determined and compared against, e.g., 80% of a maximum number MAX of tasks.

If, in step 450, it is determined that the total number of asynchronous child tasks in the system is greater than, e.g., 80% of the predetermined maximum number MAX of tasks, the method proceeds to step 440 in which the parent task is suspended and placed in a queue. Again, this may enable the system to have a chance to finish the existing tasks so the load (e.g., number of tasks) of the system may decrease to a number lower than the maximum number of tasks.

Conversely, if, in step 450, it is determined that the total number of asynchronous child tasks in the system is not greater than (i.e., less than), e.g., 80% of the predetermined maximum number MAX of tasks, the method proceeds to step 420 in which the asynchronous child task is started (e.g., executed or run). This can give the asynchronous child a chance to finish, which in turn, allows the parent task to get the response back from its child task, then complete.

It will be appreciated that the values detailed in the example of FIG. 4 may be different in alternative embodiments, For example, the figure of 80% may be raised to a higher value, such as 90%, so that a system which has only asynchronous types of applications can make more use of the capacity. Also, rather than the resource status comprising information relating to the total number of tasks running in the system, the resource status may relate to one or more other system resources in other embodiments (such as memory utilization, processor utilization, storage space, etc.) Other possibilities also exist.

Figure 5:
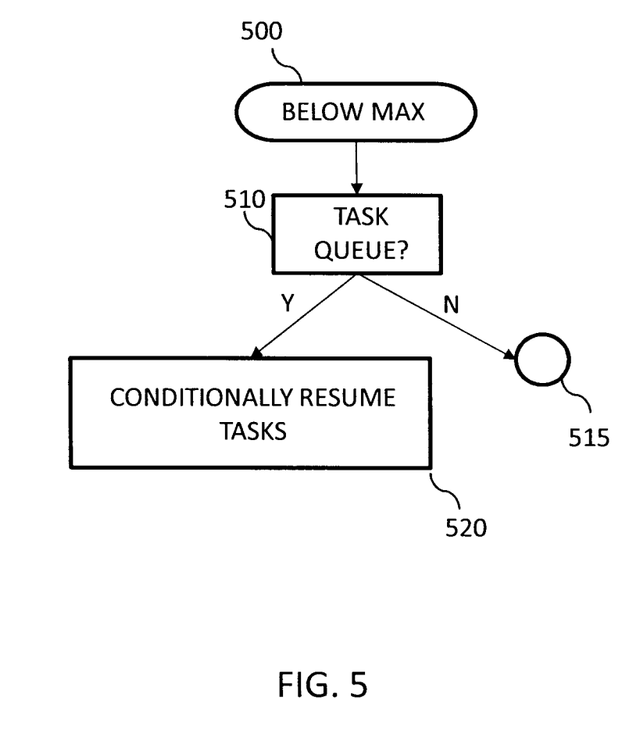
FIG. 5 is one example of a flow diagram of a process for resuming suspended tasks that may be employed in a method according to an embodiment.

Referring now to FIG. 5, there is depicted an example of a flow diagram of a process of resuming suspended tasks that may be employed in a method according to an embodiment. Such a process may be employed to decide when and how many parent tasks to resume.

When, in step 500, the system starts running less than, e.g., 100% of the maximum number of tasks, the method proceeds to 510 in which it is determined whether or not the task queue is populated.

If the task queue is not populated (e.g., there are no suspended parent tasks), the method proceeds to step 515 in which the process ends. Conversely, if in step 510 it is determined that the task queue is populated (e.g., there are one or more suspended parent tasks), the method proceeds to step 520 in which the suspended parent tasks are conditionally resumed. More specifically, in the example of FIG. 5, step 520 includes resuming the suspended parent tasks in the queue up to, e.g., a maximum 15% of the maximum number of tasks plus a gap/difference between the (current) load of the system at that time and the maximum number of tasks. Upon resumption, the method depicted in FIG. 4 (and described above) may be undertaken once again to check whether the resumed task is eligible to start its child task. Put another way, if it is determined to resume a parent task, embodiment may repeat the steps of: determining a resource status of the system; and determining whether to suspend the parent task or start the asynchronous child task based on the determined resource status of the system.

In some embodiments, there may be provided a system comprising a processing arrangement adapted to carry out any method previously described with reference to FIGS. 1 to 5.

Figure 6:
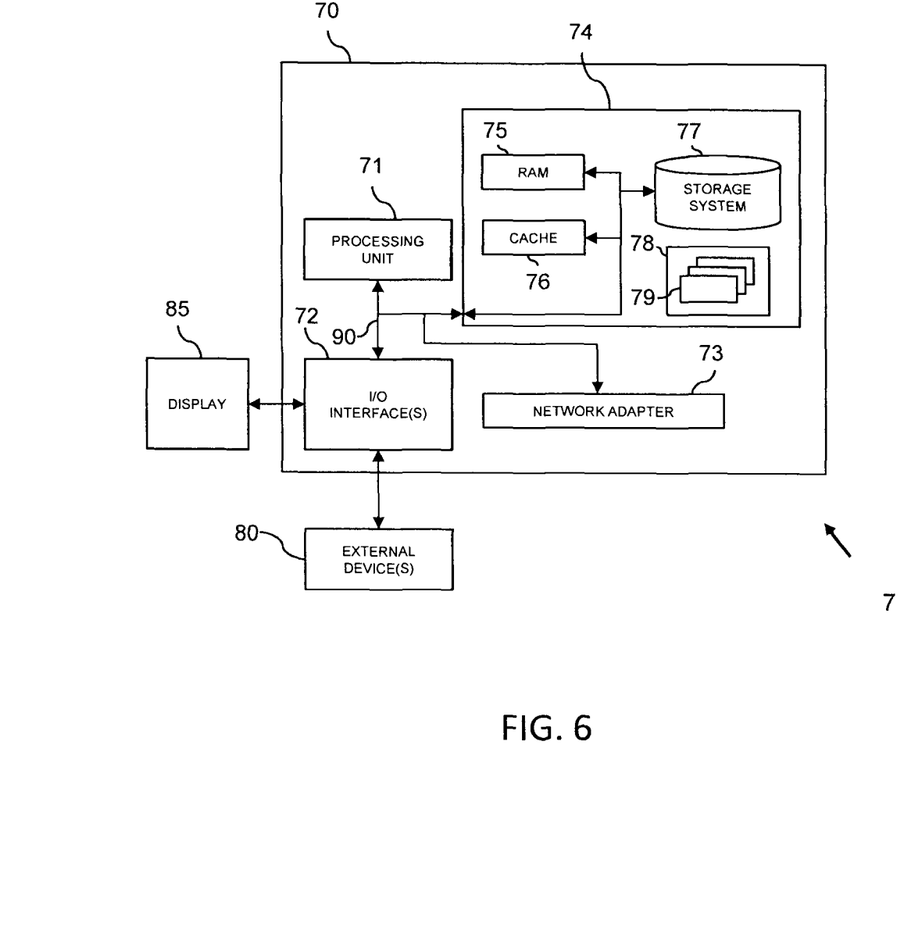
FIG. 6 illustrates a system according to an embodiment.

By way of example, as illustrated in FIG. 6, embodiments may include a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e., is a computer-implementable method. The various steps of the method may therefore reflect various parts of a computer program, e.g. various parts of one or more algorithms.

As described herein, one or more aspects of the present invention seek to provide a method of controlling asynchronous tasks in a transaction system.

Further, one or more aspects seek to provide a computer program product including computer program code for implementing the method when executed on a processor of a data processing system.

Yet further, one or more aspects seek to provide a system adapted to execute this computer program code.

Also, one or more aspects seek to provide a control system for controlling asynchronous tasks in a transaction system.

According to an embodiment of the present invention there is provided a computer-implemented method for controlling asynchronous tasks in a transaction system. The method includes obtaining a request to start an asynchronous child task. The method also includes determining a resource status of the system. The method further includes determining whether to suspend an existing parent task associated with the child task or to start the asynchronous child task based on the determined resource status of the system.

According to another embodiment of the present invention, there is provided a computer program product for controlling asynchronous tasks in a transaction system. The computer program product comprises a computer readable storage medium having program instructions embodied therewith, the program instructions executable by a processing unit to cause the processing unit to perform a method according to an embodiment of the invention.

According to another aspect of the invention, there is provided a system comprising at least one processor and the computer program product according to an embodiment. The at least one processor is adapted to execute the computer program code of the computer program product.

According to yet another aspect of the invention, there is provided a control system for controlling asynchronous tasks in a transaction system. The control system includes an interface adapted to obtain a request to start an asynchronous child task. The control system also includes a resource analysis component adapted to determine a resource status of the system. The system further includes an analysis component adapted to determine whether to suspend an existing parent task associated with the child task or to start the asynchronous child task based on the determined resource status of the system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of controlling asynchronous tasks in a system, the computer-implemented method comprising:
   automatically controlling execution of asynchronous tasks in the system, the automatically controlling comprising:
      obtaining a request to start within the system an asynchronous child task associated with a parent task executing within the system;
      based on obtaining the request to start the asynchronous child task, determining whether to suspend the parent task or to start the asynchronous child task, the determining comprising comparing a resource status of the system to a predetermined threshold, the predetermined threshold being an upper load level representative of a resource status of the system at which the system is overloaded;
      based on determining that the resource status of the system is above the predetermined threshold, suspending execution of the parent task associated with the asynchronous child task before the system starts executing the asynchronous child task, wherein the suspending execution of the parent task also prevents execution of the asynchronous child task;
      requesting at least one updated resource status of the system;
      based on receiving the at least one updated resource status, determining that the resource status of the system has decreased below the predetermined threshold to a predefined load level below the upper load level, the predefined load level being a defined percentage level below the upper load level;
      based on determining that the resource status of the system has decreased to the predefined load level below the upper load level, resuming execution of the parent task;
      based on the resuming, repeating the determining whether to suspend the parent task or to start the asynchronous child task; and
      based on determining that the resource status of the system is below the predetermined threshold, starting execution of the asynchronous child task without suspending the parent task executing within the system.

2. The computer-implemented method of claim 1, wherein the resource status of the system comprises a measure of at least one of the following: a number of tasks running in the system, a maximum number of tasks that are allowed to run in the system, available memory resources of the system, available computing resources of the system, a response time of the system, and a processing load of the system.

3. The computer-implemented method of claim 1, wherein the suspending places the parent task in a queue of one or more suspended tasks.

4. The computer-implemented method of claim 1, wherein the system is a distributed transaction system, and the request to start the asynchronous child task is provided by a client application executed by the distributed transaction system.

5. The computer-implemented method of claim 1, wherein the resource status of the system comprises a measure of a number of child tasks running in the system.

6. The computer-implemented method of claim 1, wherein the resource status of the system comprises a maximum number of tasks allowed to run in the system.

7. The computer-implemented method of claim 1, wherein the resource status of the system comprises a response time of the system.

8. The computer-implemented method of claim 1, wherein the request to start the asynchronous child task originates from the parent task.

9. The computer-implemented method of claim 1, wherein the request to start the asynchronous child task originates from another task of an application to which the parent task belongs.

10. The computer-implemented method of claim 1, wherein the request to start the asynchronous child task originates from a client application to which the parent task does not belong.

* * * * *